June 28, 1966   B. COSTELLO   3,258,145
STEPPED PALLET FORKS
Filed March 30, 1964   3 Sheets-Sheet 1
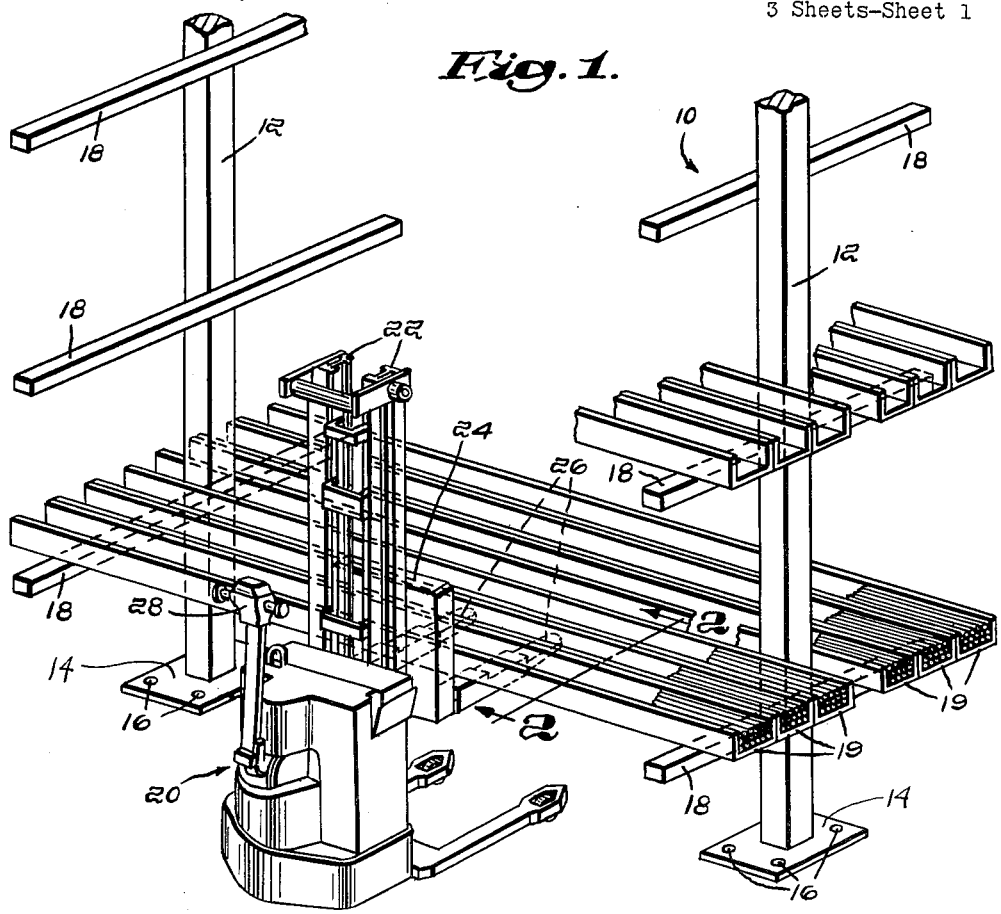
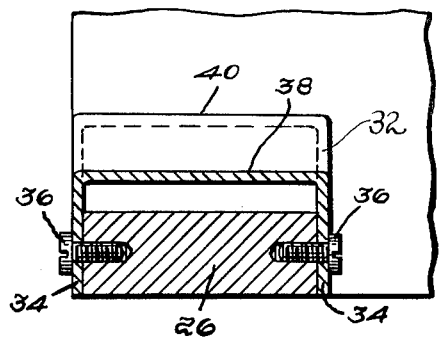
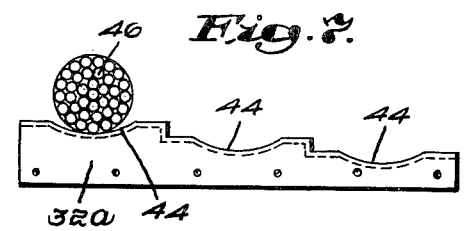
Inventor:
Bernard Costello,
by Russell, Chittick & Pfund
Attorneys

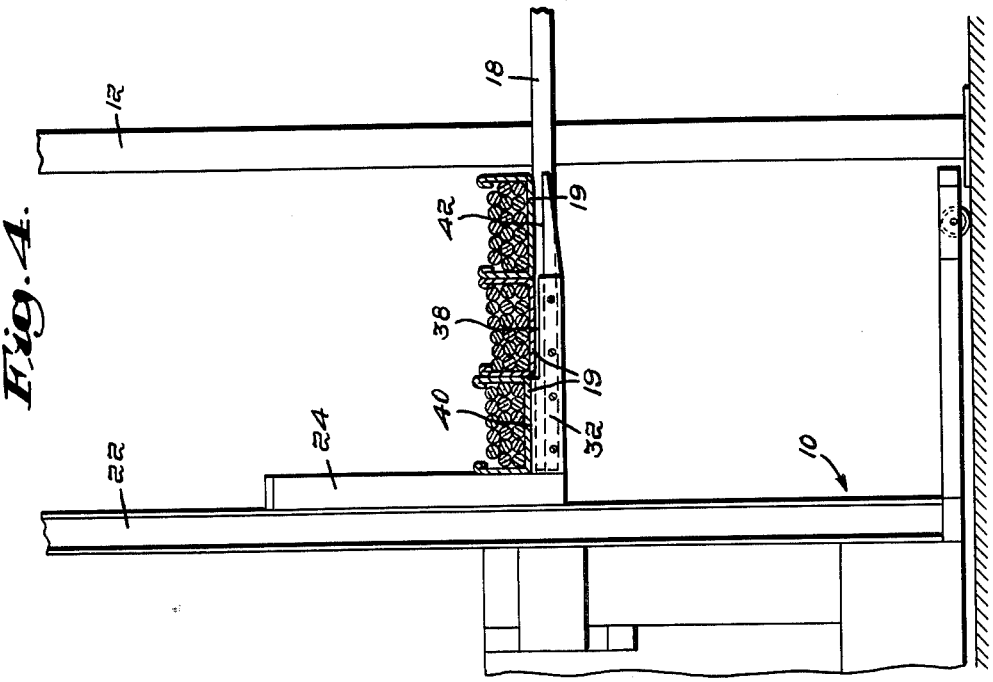
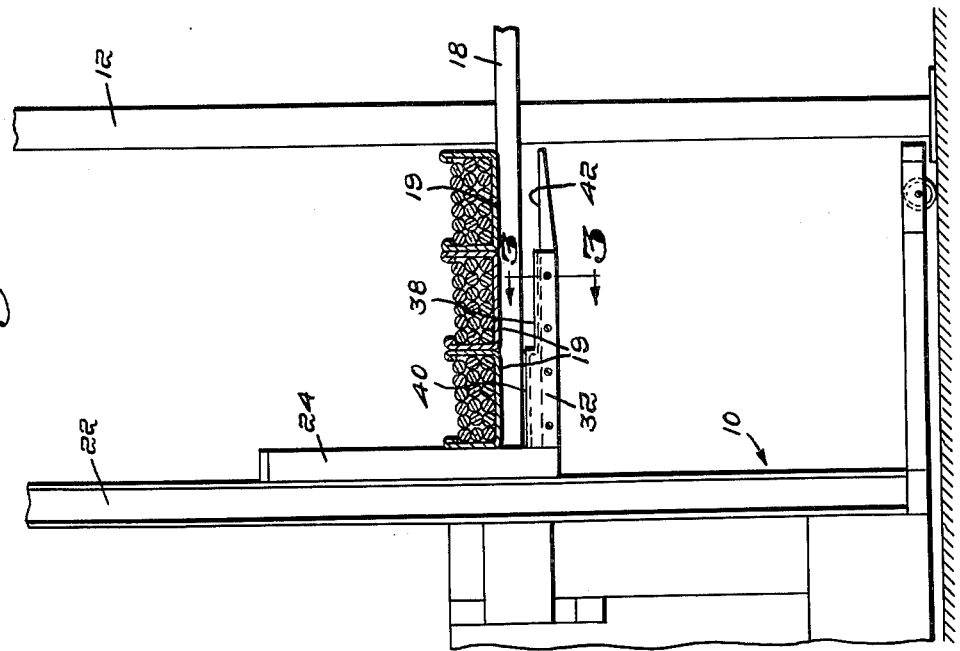

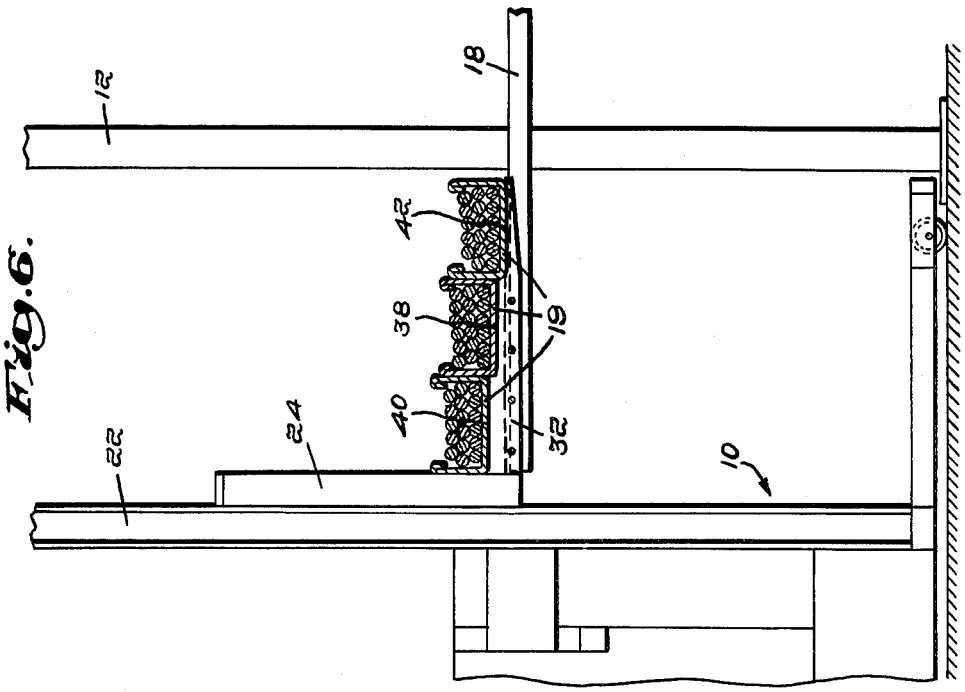
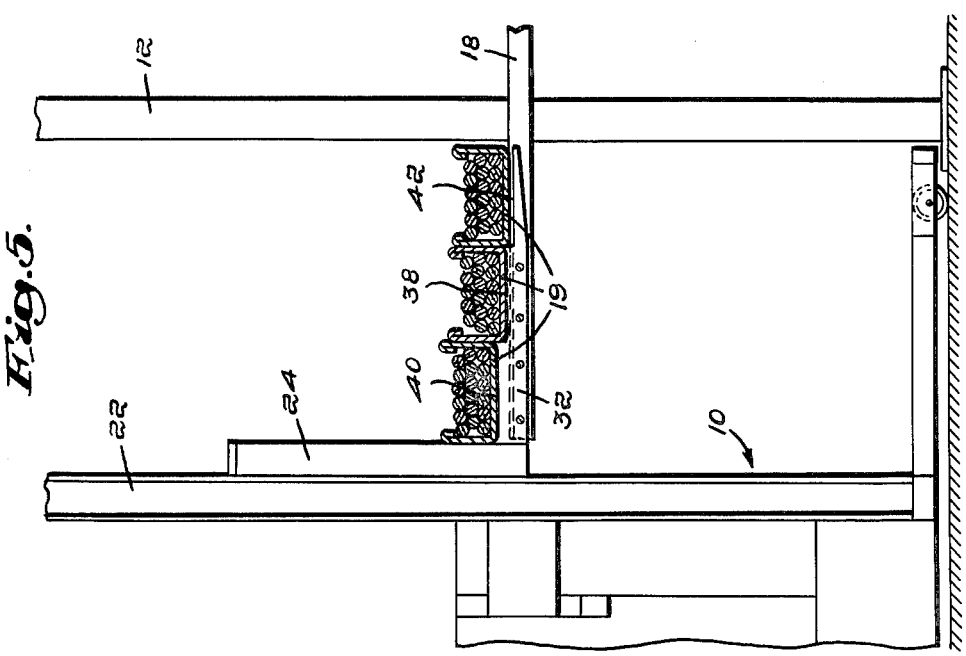

United States Patent Office 3,258,145
Patented June 28, 1966

3,258,145
STEPPED PALLET FORKS
Bernard Costello, Natick, Mass., assignor to Lewis-Shepard Company, Watertown, Mass., a corporation of Massachusetts
Filed Mar. 30, 1964, Ser. No. 355,665
3 Claims. (Cl. 214—620)

This invention relates to material handling apparatus of the type having vertically movable pallet forks and more particularly to a means for selectively removing one or more elongated articles from laterally adjacent positions resting on spaced supporting members.

Elongated articles such as bars, rods, pipes, etc., are frequently stored on racks comprised of spaced uprights having supporting arms extending horizontally therefrom. The articles, which may be collected into bundles, contained within storage trays, or individually handled, are placed in relatively closely spaced laterally adjacent positions resting on the supporting arms. In this manner, by providing a plurality of supporting arms vertically spaced on each upright at varying distances from the floor, maximum use can be made of valuable storage space.

Although this arrangement has proved generally satisfactory, difficulties have been encountered in removing the articles from their stored positions on the racks, particularly when utilizing material handling apparatus of the type having vertically movable pallet forks. To explain, when removing articles from racks of the aforementioned type, the pallet forks are first positioned beneath the articles at a point approximately halfway between the rack supporting arms. By so doing, the articles will be balanced when subsequently lifted. Thereafter, the forks are raised to engage the articles and lift them from the rack. Once this has been accomplished, the material handling apparatus is backed away from the rack and directed by an operator to any desired location.

Assuming for purposes of discussion that the articles to be handled are in the form of elongated trays containing metal rods and that three trays are held by each pair of rack supporting arms, the aforementioned procedure will pose no particular problem where all three trays are to be removed at one time. In this situation, the pallet forks are fully inserted beneath all of the articles and thereafter elevated. However, where less than the total number of trays are to be removed, the operator must take extreme care when initially positioning the forks beneath the trays. More particularly, should the removal of only two trays be necessitated, care must be taken to initially advance the forks to a point where they extend laterally beneath the first two trays but not the third. Thereafter, upward movement of the forks will result in two trays being lifted from the rack with the second tray supported in a relatively precarious position on the outermost ends of the pallet forks. Should the operator misjudge his distances and advance the material handling apparatus to a point where the ends of the pallet forks are positioned beneath all three trays, subsequent vertical displacement of the forks will result in the third tray either being lifted or overturned. It is therefore apparent that with conventional arrangements, considerable time and care must be taken to avoid mishaps and damage to the product resulting from improper positioning of the pallet forks during the lifting operation.

These disadvantages have now been obviated in a novel manner by the present invention, a general objective of which is to provide an improved means for selectively removing elongated articles from laterally adjacent stored positions on conventional storage racks.

Another object of the present invention is to provide a means of utilizing the pallet forks of conventional material handling apparatus for selectively removing one or more laterally adjacent elongated articles from conventional storage racks, the number of articles so removed depending solely on the level to which the forks are elevated.

A further object of the present invention is to provide stepped cover members for each fork, each cover member having a series of platforms varying in relative height from the lowest near the outermost end of the fork to the highest at its innermost end.

Another object of the present invention is to prevent inadvertent dislocation of articles from said stepped members following the removal thereof from said storage rack.

A further object of the present invention is to provide an improved means of visually indicating the exact number of articles being removed from the storage rack during upward displacement of the forks.

Another object of the present invention is to provide improved means for controlling the number of articles being removed from conventional storage racks during upward displacement of the forks.

These and other objects of the present invention will become more apparent as the description proceeds with the aid of the accompanying drawings in which:

FIG. 1 is a view in perspective of a conventional material handling truck positioned adjacent a storage rack with its outwardly disposed pallet forks extending beneath elongated articles stored in laterally adjacent positions on horizontally disposed spaced supporting arms;

FIG. 2 is a sectional view taken along line 2—2 of FIG. 1;

FIG. 3 is a sectional view taken along line 3—3 of FIG. 2;

FIG. 4 is a sectional view similar to FIG. 2 with the pallet forks as modified by the present invention raised slightly to engage one of the three storage trays supported on the storage rack;

FIG. 5 is a view similar to FIGS. 2 and 4 showing the modified pallet forks in engagement with two of the three storage trays;

FIG. 6 is a view similar to FIGS. 2, 4 and 5 showing the modified pallet forks raised to a position wherein all three of the storage trays have been elevated from the support rack;

FIG. 7 is a side view of a conventional pallet fork having positioned thereon an alternate embodiment of the present invention.

Referring initially to FIG. 1 wherein are best shown the general features of the present invention, a conventional storage rack indicated generally by the reference numeral 10 is shown comprised basically of spaced vertically disposed supporting posts 12 extending upwardly from floor plates 14 bolted to the floor by means of bolts indicated typically at 16. Each post 12 is provided with a plurality of vertically spaced horizontal cross-members 18 attached thereto to form supporting arms. It should be understood that each individual post 12 is provided with supporting arms at a level identical to those of adjacent support posts. The number of supporting arms and the vertical space therebetween can of course be varied over a wide range depending upon the type of article being supported thereon.

As illustrated in the drawings, articles in the form of elongated storage trays 19 are shown supported in laterally adjacent positions on the lowermost supporting arms 18 of storage rack 10. Trays of this type are frequently used in storing small diameter rods, bars, etc., and are herein utilized merely as examples of articles stored on racks of this general type. It should, however, be understood that this type of storage rack is frequently used to support large diameter pipes, bundles of rods, and other various types of elongated articles.

As can be further seen in FIG. 1, a material handling truck of conventional design generally indicated by the reference number 20 is shown positioned adjacent storage rack 10. The truck is provided with upwardly disposed masts 22 carrying a vertically movable backplate 24 having dual pallet forks 26 extending outwardly therefrom. The pallet forks are raised and lowered in a conventional manner by an operator who stands to the rear of the truck and operates control handle 28.

As can be best seen by a combined reference to FIGS. 2 and 3, the normally flat upper surface of each pallet fork 26 has been modified by positioning thereon a stepped cover member 32. Each cover member is provided with an inverted generally U-shape cross-section including depending side members 34 (see FIG. 3) bolted to the pallet fork by means of bolts indicated typically at 36.

As herein illustrated, the upper surface of each cover member 32 is provided with a stepped construction forming successively raised platforms 38 and 40. Since each cover member 32 extends over approximately two-thirds the total length of the pallet fork 26 on which it is positioned, the remaining uncovered portion of the fork forms the third and lowest platform 42. It is therefore apparent that the normally flat surface of each pallet fork has been modified to provide a series of successively raised platforms, one platform being provided for each storage tray 19 supported on cross-members 18 of storage rack 10. It should of course be understood that the cover members 32 may be constructed to accommodate any number of longitudinal articles so positioned on the storage rack.

Having thus described the principal embodiment of the present invention, its operation will now be described with particular reference to FIGS. 1, 2, 3 and 4. As shown in FIGS. 1 and 2, material handling truck 20 has been positioned approximately halfway between the vertically extending posts 12 of support rack 10 with its outwardly extending pallet forks 26 as modified by the present invention extending beneath the mid-sections of storage trays 19. It should be understood that when inserting the pallet forks beneath storage trays 19, the operator is guided by the relative position of backplate 24. More particularly, the forks are simply advanced until backplate 24 contacts the outermost tray as shown in FIG. 2. Moreover, where the trays are not properly positioned in parallel closely adjacent positions, the operator may further advance the truck in order to use backplate 24 to push the trays together. Once this has been accomplished, the individual platforms, 38, 40 and 42 are aligned directly below the overlying storage trays 19. In this manner, any uncertainty that previously existed with respect to the initial positioning of the forks is completely eliminated.

With the forks so positioned, the task of removing trays from the storage rack is considerably simplified. To explain, assuming that it is desired to remove one tray from the storage racks, the operator would elevate the pallet forks to a position as indicated in FIG. 4. At this point, the outermost storage tray has been engaged by platform 40 and raised from the supporting arms 18 of the storage rack. The material handling truck could then be backed away from the storage rack with the result that only one tray would be removed therefrom. It is important to note that this would have been accomplished by simply controlling the elevation of the pallet forks without taking any particular care during the initial positioning of the forks beneath the trays.

Where it is desired to remove two trays from the storage rack, the pallet forks are raised to a position as indicated in FIG. 5 prior to backing the material handling truck away from the storage rack. At this point in elevation of the forks, two trays have been engaged by platforms 40 and 38. In a similar manner, where it is desired to remove all three trays from the supporting arms 18, the pallet forks are simply raised to a position as indicated in FIG. 6. Here, the innermost tray has been engaged by the lowest platform 42 formed by the uncovered upper surface of the pallet fork.

In view of the above, it should now be apparent to one skilled in the art that the selective removal of one or more elongated articles from a storage rack of the aforementioned type has been greatly facilitated by modifying the conventional pallet forks through the use of stepped cover member 32. When so modified, the pallet forks can be initially positioned beneath all three trays with no special care being required on the part of the operator. Once this has been accomplished, selective removal of one or more trays is accomplished by exercising control over the elevation of the pallet forks while observing the relative vertical displacement of each individual tray.

An alternate embodiment of the applicant's invention has been illustrated in FIG. 7 wherein a modified cover member 32a has been constructed to cover the entire length of the pallet fork 26. Moreover, each successively raised platform has been further provided with a concave depression indicated typically by the reference numeral 44. This construction is provided to handle specific cases where the elongated articles to be removed from the storage rack are provided with circular cross-sections. More particularly, as shown in FIG. 7, individual rods may at times be collected into bundles 46 having substantially circular cross-sections. When handling articles of this type, means must be provided to obviate the possibility of the articles rolling off the pallet forks during their removal from the storage rack. By providing concave depressions in each raised platform, the circular articles are securely maintained in position thereon during subsequent movement of the material handling truck. Since each platform is again successively raised as with the principal embodiment, the advantages of individual positive selection are again available.

It is my intention to cover all changes and modifications of the invention herein chosen for purposes of disclosure which do not depart from the spirit and scope of the invention.

I claim:

1. For use with the outwardly extending forks of a conventional fork lift truck, means for selectively removing one or more elongated articles from laterally adjacent positions resting on spaced horizontal supporting members, said means comprising the combination of: cover members positioned on each said forks, the upper surface of each said cover members provided with a plurality of individual platforms raised in succession to provide a stepped construction, whereby when said forks having said cover member mounted thereon are positioned between said supporting members at a point beneath said elongated articles, subsequent elevation of said forks will result in said articles being successively engaged and raised from said supporting members by said successively raised platforms.

2. For use in combination with material handling apparatus having vertically movable outwardly extending lift forks associated therewith, means for selectively removing one or more elongated articles from laterally adjacent positions supported by spaced horizontal supporting arms, said means comprising the combination of: cover members removably mounted on each of said forks, each said cover members comprising an upper surface with side members downwardly extending therefrom to form an inverted channel member, said cover members positioned over said forks and held thereon by fastening means extending through said side members into engagement with said forks, the upper surface of each said cover members forming a plurality of individual platforms raised in succession to provide a stepped construction, whereby when said forks having said cover members positioned thereon are placed between said supporting arms and beneath said articles, subsequent elevation of said forks will result in said articles being successively engaged and raised from said arms by said platforms.

3. Apparatus for use in handling elongated articles supported in laterally adjacent positions on spaced horizontally extending support arms, said apparatus comprising the combination of a material handling truck of the type having vertically movable lift forks extending outwardly therefrom, removable adaptors positioned on each said forks, the upper surface of each said adaptors provided with a plurality of steps raised in succession from the lowest step beginning at the tip of said forks to the highest step at the inner end thereof adjacent said material handling apparatus, said forks when positioned between said supporting arms and beneath said articles capable of being elevated to place said steps in successive engagement with said articles.

References Cited by the Examiner
UNITED STATES PATENTS

| | | | |
|---|---|---|---|
| 2,717,801 | 9/1955 | Neil | 294—67 |
| 2,928,563 | 3/1960 | Cushman | 214—620 |
| 2,992,749 | 7/1961 | Spillios | 214—750 |

GERALD M. FORLENZA, *Primary Examiner.*

R. B. JOHNSON, *Assistant Examiner.*